J. SPEAR.

Heating Stoves.

No. 5,314. Reissued March 4, 1873.

Witnesses { Park W. Farland, Jr. / John F. Grant }

James Spear
by Edw. Brown
Attorney

A.M. PHOTO-LITHOGRAPHIC CO. N.Y. (OSBORNE'S PROCESS.)

UNITED STATES PATENT OFFICE.

JAMES SPEAR, OF PHILADELPHIA, PENNSYLVANIA.

IMPROVEMENT IN HEATING-STOVES.

Specification forming part of Letters Patent No. 102,328, dated April 26, 1870; reissue No. 5,314, dated March 4, 1873.

*To all whom it may concern:*

Be it known that I, JAMES SPEAR, of the city and county of Philadelphia and State of Pennsylvania, have invented certain Improvements in Stoves, of which the following is a specification:

The nature of my invention consists in the construction of the fire-pot of a stove, or heater, so provided with an opening near its front and base, and a hearth in connection therewith, that the clinkers formed in the grate can be removed without the necessity of making a new fire, and in the construction and arrangement of the grate in relation to the base of the stove. The grate, together with the bottom of the fire-pot, is suspended within the base of the stove, and the upper portion of the base immediately surrounding this depressed fire-pot and grate is conical in form, and enlarged or extended outward from its junction with the fire-pot. Doors with mica windows are arranged in the base, which afford (to the persons in a room) a better view of the state of the bottom of the fire, and utilize and spread the light and heat throughout the room.

To enable others skilled in the art to make and use my invention, I will now proceed to describe its construction and operation, reference being had to the accompanying drawing, in which—

Figure 1:
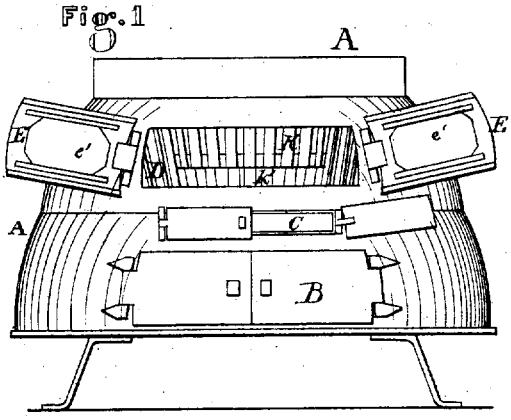
Figure 3:
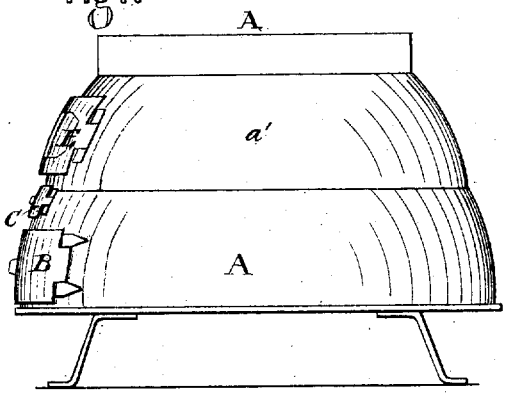
Figure 2:
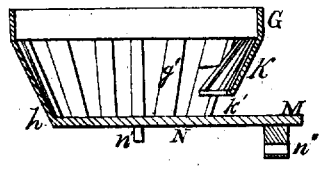
Figure 3:
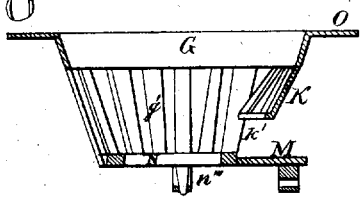
Figure 4:
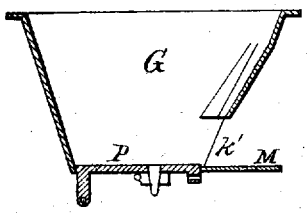
Figure 5:
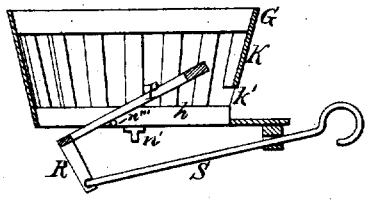
Figure 6:
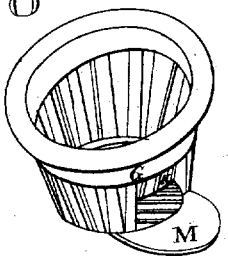

Figure 1 is a general view of the base, showing the basket-grate inside. Figs. 2, 3, and 5 are sections through my grate showing various modifications of the same improvement. Fig. 4 shows the grate made solid as a substitute for the basket-grate. Fig. 6 is a perspective view of my grate, showing the opening in front and the hearth-plate. Fig. 7 is a side elevation of the base.

In Fig. 1, A is the base of the stove. It joins the fire-pot at the ring G, so that the air admitted to the base passes through the grated bars of the fire-pot and grate. The upper part $a'$ of the base is on a level with the opening D, and is shaped like the frustum of a cone, having a slight curve to give it more symmetry of appearance. The lower part of the base may be as shown. B, the door of the ash-pit; C, the door through which the pokers are inserted for shaking and dumping the grate. D is another opening at the level just above the grate-bars, through which the state of the fire at the bottom of the fire-pot may be observed. This opening is closed by doors E, which have therein transparent lights $e'$, so that the base may be entirely closed air-tight, and the state of the fire still be visible in the grate.

In Fig. 2, G is a band, or ring, at the top of the basket-grate, to which the bars $g'$ are secured. They are connected at the bottom by a ring, $h$, as shown in Fig. 5. The bars K, at the front of the grate, do not reach to the bottom within two or three inches, so that an opening, K′, is made, through which the cinders and clinkers can be pulled out by a poker inserted through the opening D. Beneath the opening K′ I project a hearth-plate, M, upon which the coals or cinders which escape through the said opening will bank up at their natural inclination, and the fire is thereby prevented from falling out. The bars K are also projected inward rather more than the bars $g'$, so as to avoid the necessity for extending the hearth-plate M too far out. In this Fig. 2 the grate-bars N and hearth-plate M are all rigid together, and turn upon the center-pin $n'$. A poker is inserted through the opening C in the base, and into the hole $n''$, by which the grate is vibrated.

In Fig. 3 a flange, $o$, is shown around the top of the fire-pot, by which it is suspended; the hearth M is rigid to the grate. The grate N vibrates upon a pivot, $n'''$, independent of the basket.

In large heaters, where the heat is not required in the base of the heater, I make a solid basket, (see Fig. 4,) supplied with an opening in the front, K′, above the hearth M, and also with a vibratory and dumping grate, P. In large fire-chambers for heaters it would require too much strength to move the entire basket when solid, as here shown. By this plan, however, the same advantages can be gained, the slate and clinkers easily removed, and a perpetual fire kept going.

The grate in Fig. 5 is nearly similar to that in Figs. 3 and 4; it is vibrated on a center-pin, $n'$. The grate P is supported on pivots $n'''$, and has a depending arm, R, to which a rod, S, is hooked for dumping the grate and letting out all the ashes whenever required.

It is evident that the opening K′ may be made at the rear of the fire-pot, as in front, if desirable.

Having now described the construction of the parts, I will further state the advantages derived therefrom. One of the objections to stoves now in use is this, that the grate is certain in time to be clogged with slate and clinkers, rendering it necessary for the fire to be put out and the grate dumped at certain intervals. This is especially inconvenient in those stoves called reservoir stoves, also in heaters, as the fire is expected to be kept in night and day for a long time. By this construction of grate the clinkers which will not pass through the grate-bars are easily removed through the opening K′ by means of a hooked poker, and the fire thus kept in as long as the stove will last. In constructing my grate for parlor-stoves, where the heat is required near the floor, I make it in a basket form, as herein shown, and supported in the base of the stove with the usual pivot bar. By dropping the grate into the base of the stove I thereby lengthen the depth of the fire-chamber, and thus throw a greater heat into the base of the stove. Also, by enlarging the base in a conical form, I provide means for keeping the hearth within the base, and also make it much more convenient to operate with a poker upon the ashes and clinkers at the bottom of the fire-pot; and the mica windows being set at an angle, give a better view of the fire to persons in the room, and throw out more light and heat.

I do not broadly claim the hearth M when it forms the hearth proper of the stove.

What I claim as my invention, and desire to secure by Letters Patent, is—

1. The grate G, with opening K′ and hearth-plate M arranged within the base A, substantially as herein described.

2. The arrangement of the grate and lower part of the grated fire-pot within and in combination with the cone-shaped base A, as described.

3. The arrangement of the grate and lower part of the fire-pot within and in combination with the conical base A, when such base is provided with doors or windows *e′*, for the purpose herein described.

JAMES SPEAR.

Witnesses:
JOHN P. LEY,
JOHN ECKERT.